US012546739B2

(12) United States Patent
Samec et al.

(10) Patent No.: US 12,546,739 B2
(45) Date of Patent: Feb. 10, 2026

(54) SENSOR FOR MEASURING PH AND/OR TEMPERATURE

(71) Applicant: PELEOS TECHNOLOGIES, LLC, Sarasota, FL (US)

(72) Inventors: Nicole Elizabeth Samec, Sarasota, FL (US); Chun-Yuh Huang, Miami, FL (US); Kristen Ashley Samec-Terra, Sarasota, FL (US)

(73) Assignee: PELEOS TECHNOLOGIES, LLC, Sarasota, FL (US)

( * ) Notice: Subject to any disclaimer, the term of this patent is extended or adjusted under 35 U.S.C. 154(b) by 390 days.

(21) Appl. No.: 18/481,365

(22) Filed: Oct. 5, 2023

(65) Prior Publication Data

US 2024/0118233 A1    Apr. 11, 2024

Related U.S. Application Data

(60) Provisional application No. 63/413,297, filed on Oct. 5, 2022.

(51) Int. Cl.
*G01K 7/34* (2006.01)
*G01N 27/22* (2006.01)

(52) U.S. Cl.
CPC .......... *G01N 27/227* (2013.01); *G01K 7/34* (2013.01)

(58) Field of Classification Search
CPC .............................. G01K 7/34; G01N 27/227
See application file for complete search history.

(56) References Cited

U.S. PATENT DOCUMENTS

| 4,571,543 A * | 2/1986 | Raymond | G01N 27/227 324/717 |
| 2004/0223884 A1* | 11/2004 | Chen | G01N 29/036 422/88 |
| 2007/0237204 A1* | 10/2007 | Kwon | G01K 7/34 374/E5.002 |
| 2025/0083142 A1* | 3/2025 | Meier | G01N 27/4145 |

* cited by examiner

*Primary Examiner* — Randy W Gibson
(74) *Attorney, Agent, or Firm* — Mark Terry

(57) ABSTRACT

A sensor includes an enclosure comprising a chamber having an interior volume, a sensitive material located within the chamber, wherein said material changes volume according to an ambient level of a substance or environmental attribute, a marker located within the material, and a sub-sensor configured to measure displacement of the marker within the chamber. The sensor further comprises a processor located within the enclosure, the processor communicably coupled with the sub-sensor and configured for collecting data from the sub-sensor, and a power supply communicably coupled with the processor.

22 Claims, 7 Drawing Sheets

SENSOR FOR MEASURING PH AND/OR TEMPERATURE

CROSS REFERENCE TO RELATED APPLICATIONS

This patent application claims priority to provisional patent application 63/413,297 filed Oct. 5, 2022, and titled "Sensor for Measuring pH and/or Temperature." The subject matter of provisional patent application 63/413,297 is hereby incorporated by reference in its entirety

STATEMENT REGARDING FEDERALLY SPONSORED RESEARCH DEVELOPMENT

Not applicable.

INCORPORATION BY REFERENCE OF MATERIAL SUBMITTED ON A COMPACT DISC

Not applicable.

TECHNICAL FIELD

The technical field relates generally to sensors and more specifically to new devices and methods for measuring pH and temperature.

BACKGROUND

Conventional modern-day sensors, pivotal in various technological and scientific applications, have significantly advanced our ability to collect data, such as temperature and acceleration, with enhanced precision and reliability. However, despite their ubiquity and utility, contemporary sensors are not without their limitations. Issues such as sensitivity to environmental conditions, energy consumption, size, and cost often pose significant challenges. For instance, certain sensors may exhibit diminished accuracy in extreme environments, such as high temperatures, or may be adversely affected by other environmental factors like humidity or pressure. Furthermore, the miniaturization of sensors, while maintaining or enhancing their accuracy and reliability, remains a pertinent challenge.

Similarly, a pH sensor is a device that measures hydrogen-ion activity, indicating its acidity or alkalinity expressed as pH. Typically, a pH sensor measures the difference in electrical potential between a pH electrode and a reference electrode. The difference in electrical potential relates to the acidity or pH of the item being measured. pH sensors may be used in many different applications ranging from laboratory experimentation to medicine. One of the drawbacks associated with conventional pH sensors is that they require extremely precise electrodes and highly accurate potentiometers. These elements can be costly to produce and often have issues with accuracy and precision. Another drawback associated with conventional pH sensors is that electrodes can degrade over time, which can affect the precision of the instrument or cause malfunctions.

Likewise, a temperature sensor is a device that measures temperature or a temperature gradient. A thermometer is one example of a temperature sensor that measures temperature and converts the measurement to a numerical value. Temperature sensors are widely used in technology and industry to monitor processes, in meteorology, in medicine, and in scientific research. One of the drawbacks associated with conventional temperature sensors is their lack of precision and the high cost of precision parts. This can be cost prohibitive for manufacturers and consumers.

Therefore, a need exists for improvements over the prior art, and more particularly for more accurate, less costly, and user-friendly sensors.

SUMMARY

A sensor is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

A sensor includes an enclosure comprising a chamber having an interior volume, a material sensitive to a particular substance or environmental attribute located within the chamber, wherein said material changes volume according to an ambient level of said particular substance or environmental attribute, a marker located within the material, and a sub-sensor configured to measure displacement of the marker within the chamber. The sensor further comprises a processor located within the enclosure, the processor communicably coupled with the sub-sensor and configured for collecting data from the sub-sensor, and a power supply communicably coupled with the processor.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
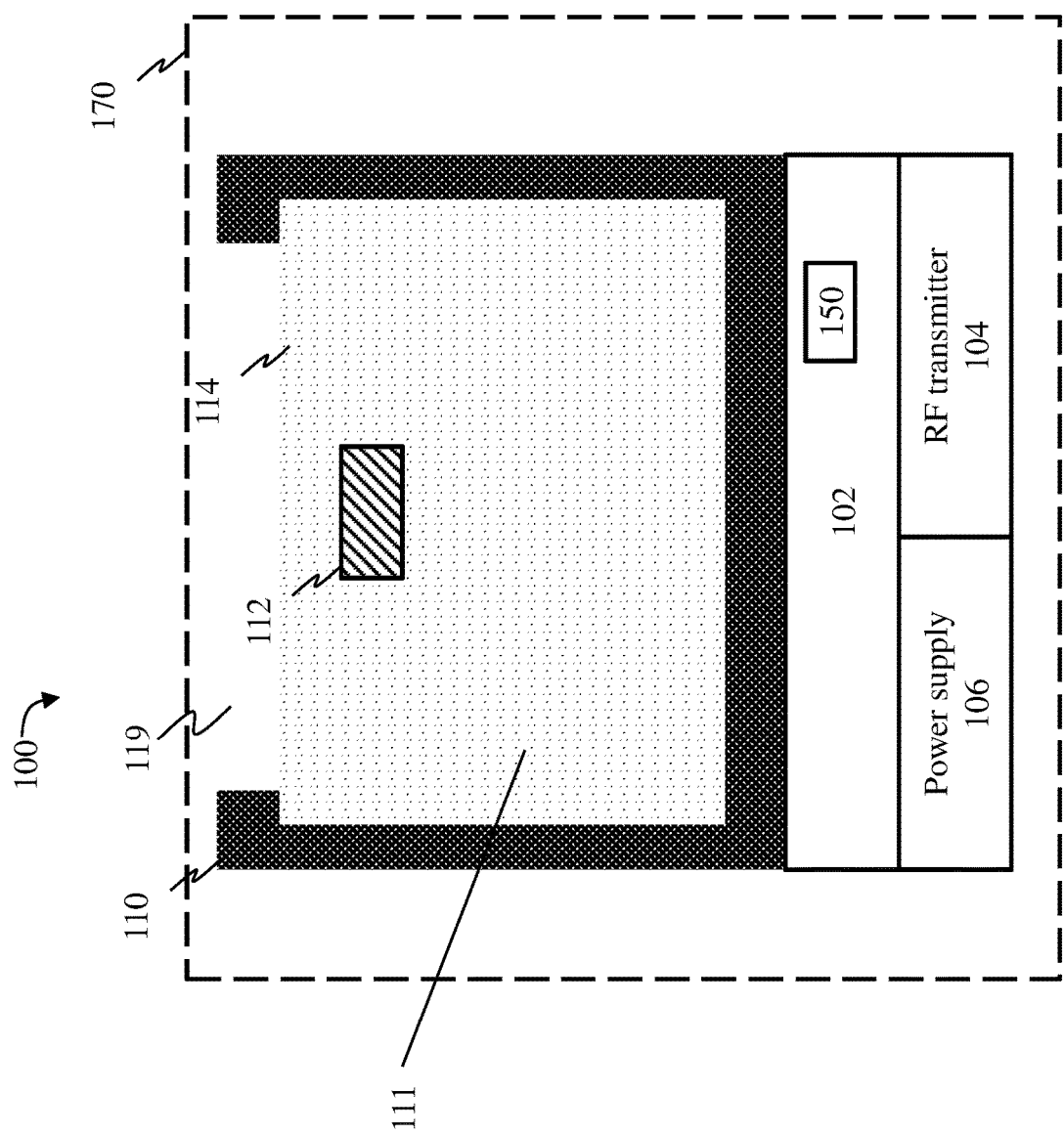
FIG. 1 is an illustration of a first embodiment of a sensor for measuring ambient levels of a substance or an environmental attribute, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing an inexpensive, simple, accurate, and user-friendly sensor for measuring the ambient level of any of a variety of substances or environments, such as the ambient level of water, humidity, or heat. The claimed subject matter allows for the measuring of the ambient level of a substance or environment in a novel and improved fashion. The claimed subject matter also improves over the prior art by allowing for a human implantable version of the device for measuring a substance or environment and transmitting to a computing device for further analysis by a medical professional or other automated systems.

The claimed subject matter improves over the prior art by providing an inexpensive, simple, accurate, and user-friendly method and system for measuring pH and/or temperature data. The claimed subject matter allows for the measuring of pH and/or temperature data in a novel and improved fashion. The claimed subject matter also improves over the prior art by allowing for a human implantable version of the device for measuring pH and/or temperature data and transmitting to a computing device for further analysis by a medical professional or other automated systems.

The claimed subject matter enhances advancements over existing technology by offering a sensor that is not only affordable and straightforward but also precise and easy to navigate for gauging pH and/or temperature data. The claimed subject matter introduces an enhanced manner for conducting measurements of pH and/or temperature data. Additionally, the claimed subject matter surpasses previous technologies by facilitating a version of the device that can be implanted in humans, which is capable of transmitting pH and/or temperature data to a computational device, thereby enabling further examination by healthcare experts or alternative automated systems.

Looking at FIG. 1, the sensor device 100 comprises a sensor that includes an enclosure 170 comprising a chamber 110 having an interior volume 111, and a sensitive material 114 located within the interior volume 111 of the chamber 110. Said sensitive material 114 changes volume according to an ambient level of a substance or environmental attribute. The device 100 also includes a marker 112 located within the material 114 inside the interior volume 111 of the chamber 110, and a displacement sub-sensor 102 configured to measure displacement of the marker 112 within the chamber 110.

The enclosure 170 and/or the chamber 110 comprise rigid walls. The chamber 110 has one or more openings 119, which is shown at the top of the chamber in FIG. 1. The opening 119, which may be permeable or semipermeable, of the chamber allows for substances in the environment or the environmental attribute to interact with the sensitive material 114 within the chamber through the opening. The substance to which material 114 is sensitive may be a molecule or compound such as water, glucose, or lactic acid. Material 114 may also be sensitive to pH, which is a measure of how acidic/basic a substance is. pH range goes from 0-14, with 7 being neutral, less than 7 indicating acidity, and greater than 7 indicating a base. pH may measure the relative amount of free hydrogen and hydroxyl ions in a substance. The environmental attribute to which material 114 is sensitive may be pressure, temperature, humidity, magnetic fields, gravitational fields, etc. Material 114 may be a hydrogel or a polymer that is sensitive to a substance or environmental attribute.

The device 100 further comprises a radio frequency (RF) transmitter 104 within the enclosure 170, and a processor 150 within the enclosure 170, the processor 150 communicably coupled with the sub-sensor 102 and the RF transmitter 104. The processor 150 is configured for collecting data from the sub-sensor 102 and activating the RF transmitter 104 to transmit said data. The device 100 further comprises a power supply 106 communicably coupled with the processor 150. The processor may include software and firmware included to tune the transmitter on/off, receive firmware updates, have algorithms to be able to conduct onsite analysis like diagnostic tests, etc. In one embedment, the processor 150 is a computing device 700, as described in greater detail below.

The displacement sub-sensor 102 may be a displacement sensor used for measuring positional movement or detecting the movement of a given object such as the marker 112. The displacement sub-sensor 102 may also be a magneto-resistive sensor that detects changes in electrical resistance. The displacement sub-sensor 102 (which may be a proprietary low energy sensor) may also be a hall sensor, a conductive sensor, an ultrasound sensor, or an optical sensor. In one embodiment, the sub-sensor may be a capacitive displacement sensor, an inductive sensor or the like. Additionally, the sub-sensor may be used to conduct other analysis, for example, determining density, or the movement of or the rate of fluid through a hydrogel. The data collected from the sub-sensor 102 may be an amount of displacement of the marker within the compartment.

The marker 112 may be a metallic element, magnet, a conductive metal, or a light or sound reflective material that is used by the displacement measurement of the displacement sub-sensor 102 to determine how much the marker has moved within the material 114 inside the interior volume 111 of the chamber 110. Said amount of movement is proportional to the ambient level of the substance to which the material 114 is sensitive or the ambient level of the environmental attribute to which the material 114 is sensitive. The confined chamber 110 guides deformation of the material 114 along a specific direction as a result of an ambient level of the substance or environmental attribute.

The RF transmitter 104 may be a low power, high frequency transmitter that allows for wireless data transmission over short distance such as the Wi-Fi or Bluetooth protocols. In one embodiment, the device 100 may also include an RF receiver which may also be a low power, high frequency transmitter that allows for wireless data transmission over short distance such as the Wi-Fi or Bluetooth protocols. In one embodiment, there may be more than one marker, or the marker may be flexible, such that if the deformation isn't uniform, then the device may use algorithms to determine the amount of movement, i.e., volume change, that has occurred. The power supply 106 may be a low voltage power supply, an energy harvesting device, an inductive charging device, or the like.

Figure 2:
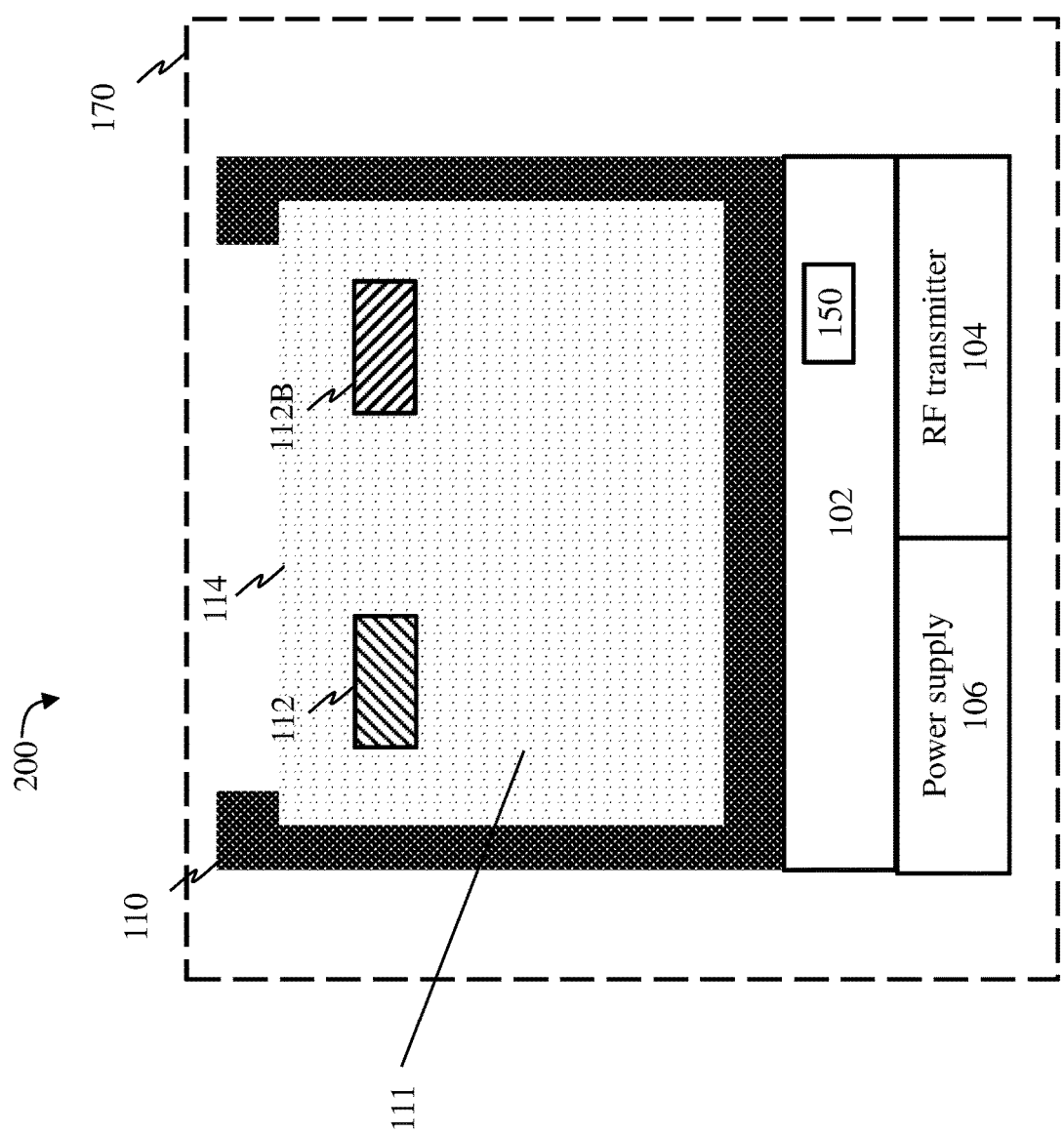
FIG. 2 is an illustration of a second embodiment of a sensor for measuring ambient levels of a substance or an environmental attribute, according to an example embodiment.

FIG. 2 is an illustration of a second embodiment of a sensor device 200 for measuring ambient levels of a substance or an environmental attribute, according to an example embodiment. Like the sensor device 100 of FIG. 1, the sensor device 200 includes an enclosure 170, chamber 110, sensitive material 114, marker 112, sub-sensor 102, processor 150, power supply 106, and RF transmitter 104. In addition, the sensor device 200 includes an additional marker 112B such that if deformation of material 114 isn't uniform, then the sensor device 200 may use algorithms to determine the amount of movement, i.e., volume change, that has occurred. In one embodiment, sensor device 200 can include any number of additional markers configured to facilitate making measurements.

Figure 3:
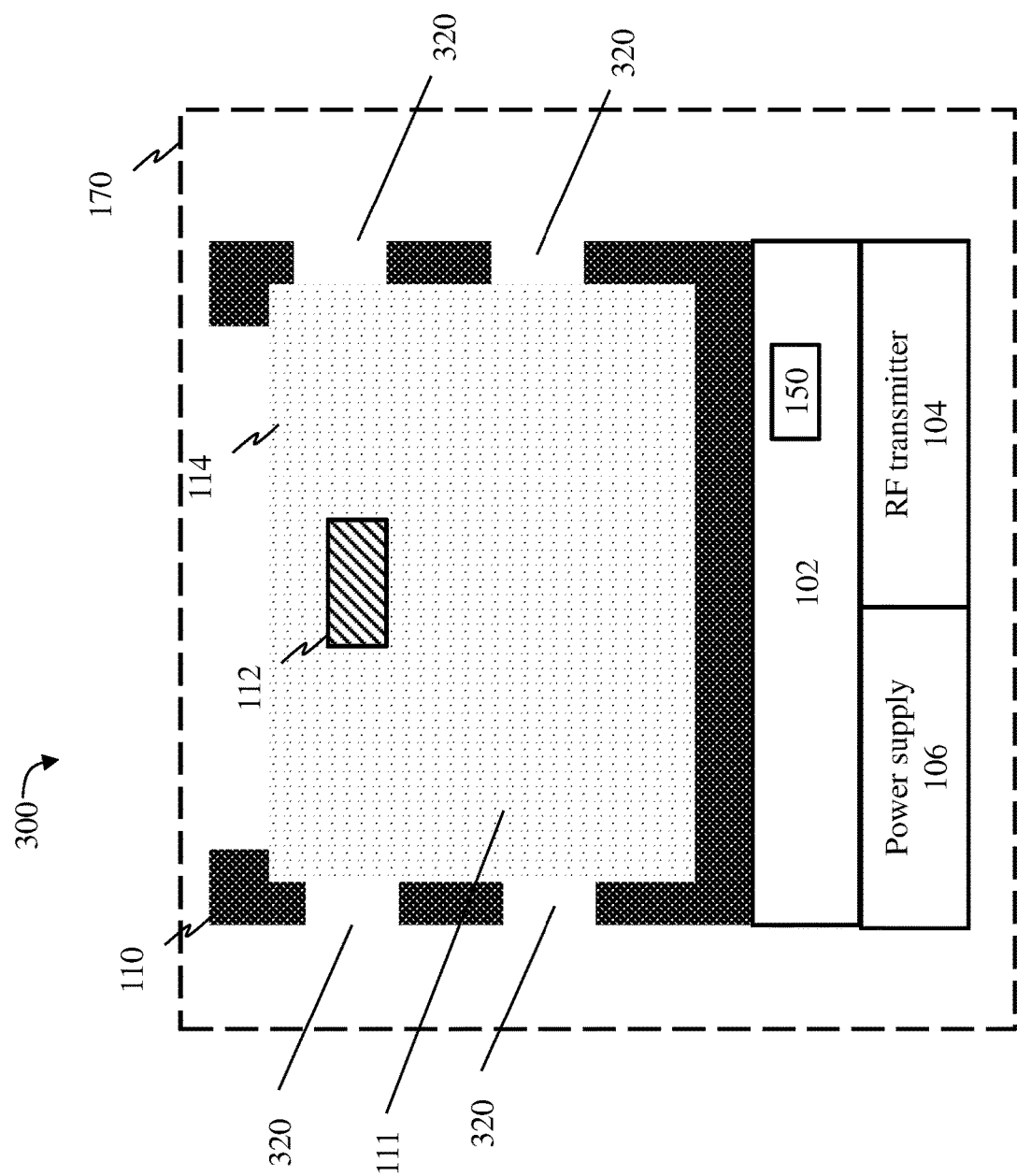
FIG. 3 is an illustration of a third embodiment of a sensor for measuring ambient levels of a substance or an environmental attribute, according to an example embodiment.

FIG. 3 is an illustration of a third embodiment of a sensor device 300 for measuring ambient levels of a substance or an environmental attribute, according to an example embodiment. Like the sensor device 100 of FIG. 1, the sensor device 300 includes an enclosure 170, chamber 110, sensitive material 114, marker 112, sub-sensor 102, processor 150, power supply 106, and RF transmitter 104. In addition, the sensor device 300 includes additional openings 320 in the walls of the chamber 110, wherein multiple openings allow for a faster intake of the substance or environmental attribute to which material 114 is sensitive. The fluid interaction through the openings 320 could be through permeable or semipermeable openings, which may include a permeable or semipermeable membrane in the openings 320.

Figure 4:
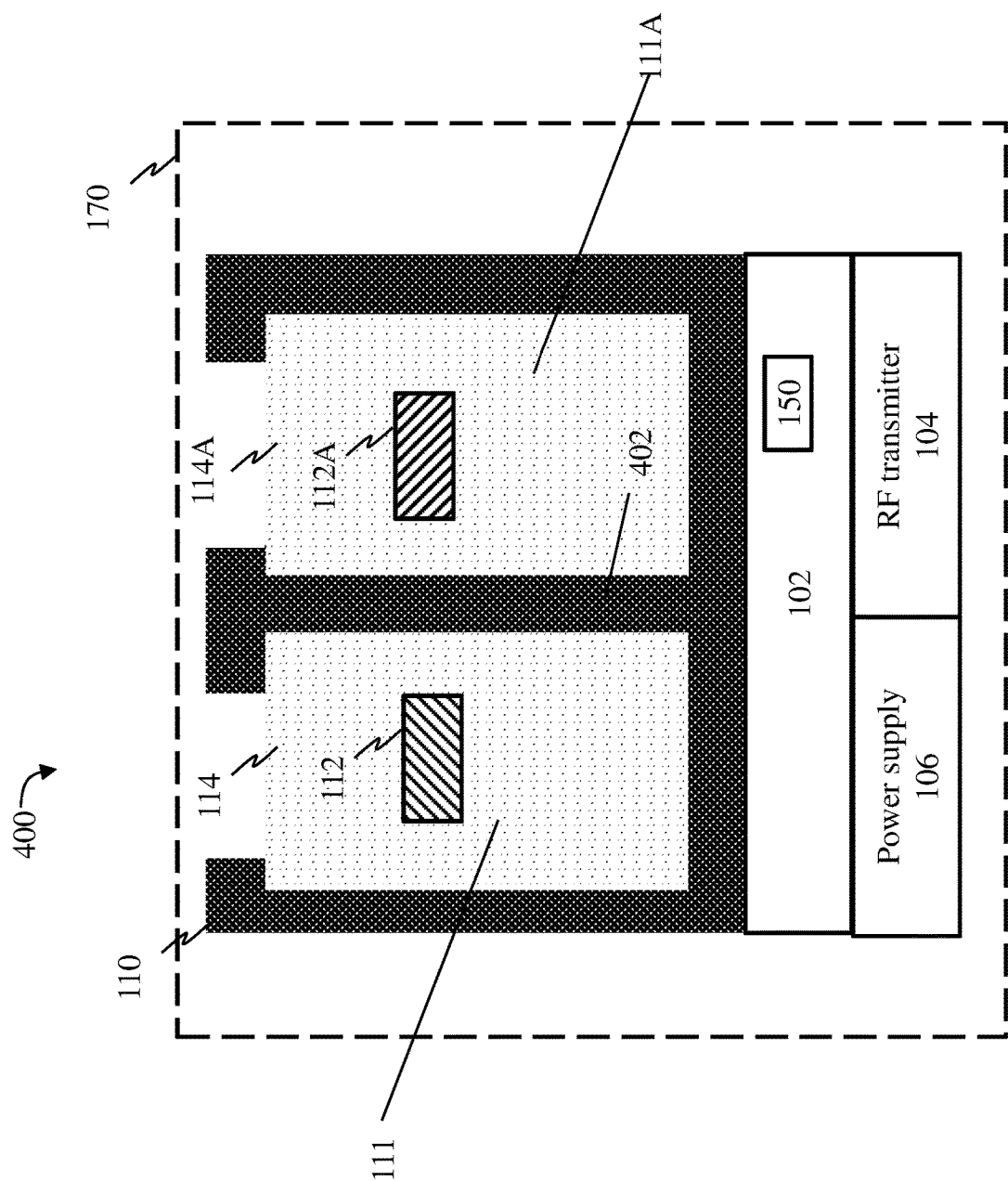
FIG. 4 is an illustration of a fourth embodiment of a sensor for measuring ambient levels of a substance or an environmental attribute, according to an example embodiment.

FIG. 4 is an illustration of a fourth embodiment of a sensor device 400 for measuring ambient levels of a substance or an environmental attribute, according to an example embodiment. Like the sensor device 100 of FIG. 1, the sensor device 400 includes an enclosure 170, chamber 110, sensitive material 114, marker 112, sub-sensor 102, processor 150, power supply 106, and RF transmitter 104. In addition, the sensor device 400 includes a wall or divider 402 that divides the chamber into two interior volumes 111 and 111A. The first interior volume 111 includes a first sensitive material 114 and first marker 112 and the second interior volume 111A includes a second sensitive material 114A and second marker 112A. Multiple different sensitive materials may be used for 114 and 114A, such that one may measure pH and the other temperature, for example. Each interior volume could include different sensitive materials, such that more than one item may be measured at once by the same sensor device 400. In one embodiment, sensor device 400 can include any number of additional interior volumes, each configured to make measurements.

Figure 5:
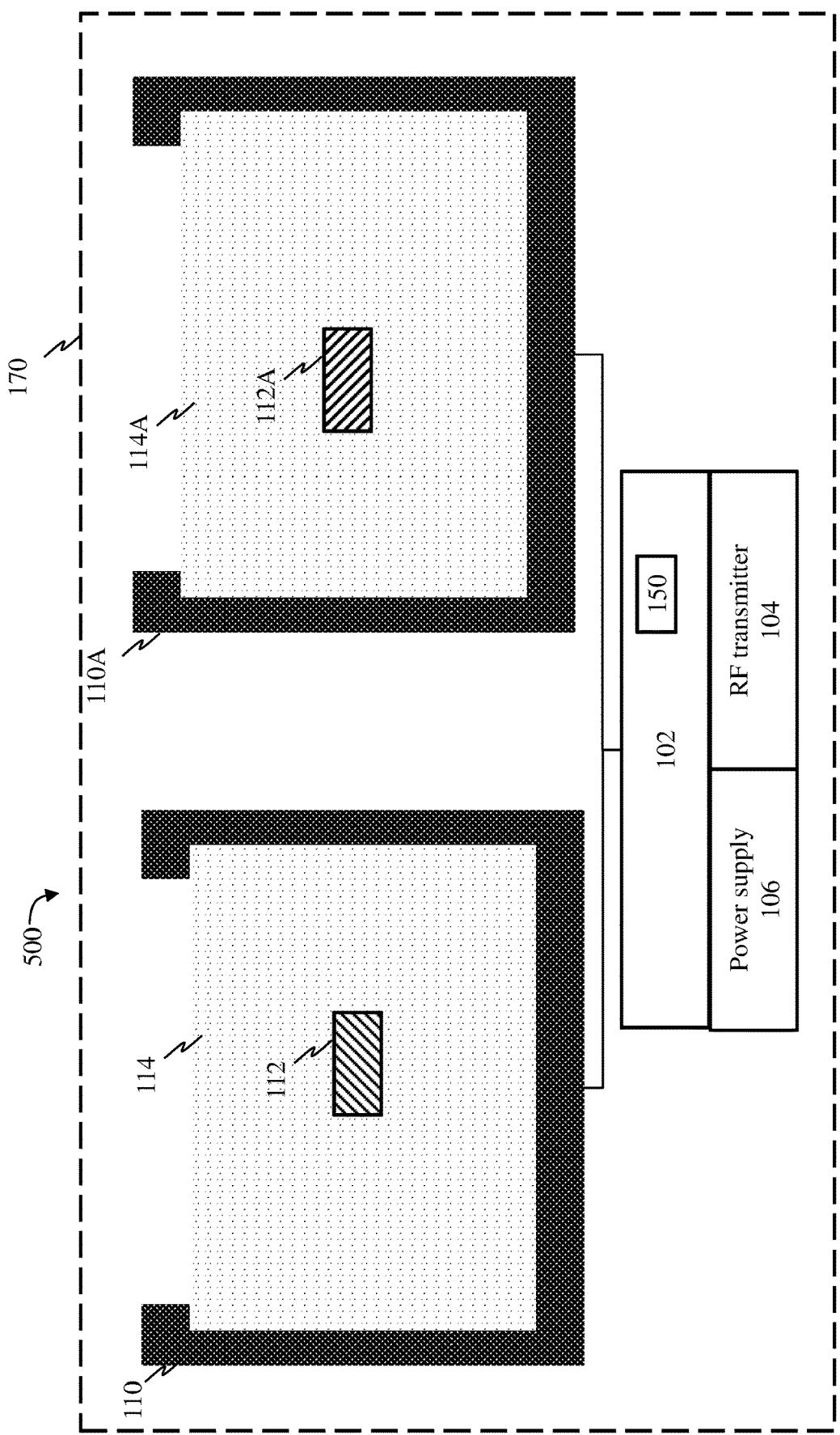
FIG. 5 is an illustration of a fifth embodiment of a sensor for measuring ambient levels of a substance or an environmental attribute, according to an example embodiment.

FIG. 5 is an illustration of a fifth embodiment of a sensor device 500 for measuring ambient levels of a substance or an environmental attribute, according to an example embodiment. Like the sensor device 100 of FIG. 1, the sensor device 500 includes an enclosure 170, chamber 110, sensitive material 114, marker 112, sub-sensor 102, processor 150, power supply 106, and RF transmitter 104. In addition, the sensor device 500 includes another chamber 110A, with material 114A and marker 112A, wherein both chambers 110, 110A are communicatively coupled with the sub-sensor 102 and processor 150. In one embodiment, sensor device 500 can include any number of additional chambers and interior volumes, each configured to make measurements.

Sensor device 500 allows for placement of the chambers in different locations. For example, one chamber could be located inside the body and the other outside of the body. In another example, one chamber may be located at the start of an incision site and the other at the end of the incision site. The first chamber 110 includes a first sensitive material 114 and the second chamber 110A includes a second sensitive material 114A. Multiple different sensitive materials may be used for 114 and 114A, such that one may measure pH and the other temperature, for example. Each interior volume could include different sensitive materials, such that more than one item may be measured at once by the same sensor device 500. In one embodiment, each interior volume of multiple chambers could include the same sensitive materials.

Figure 6:
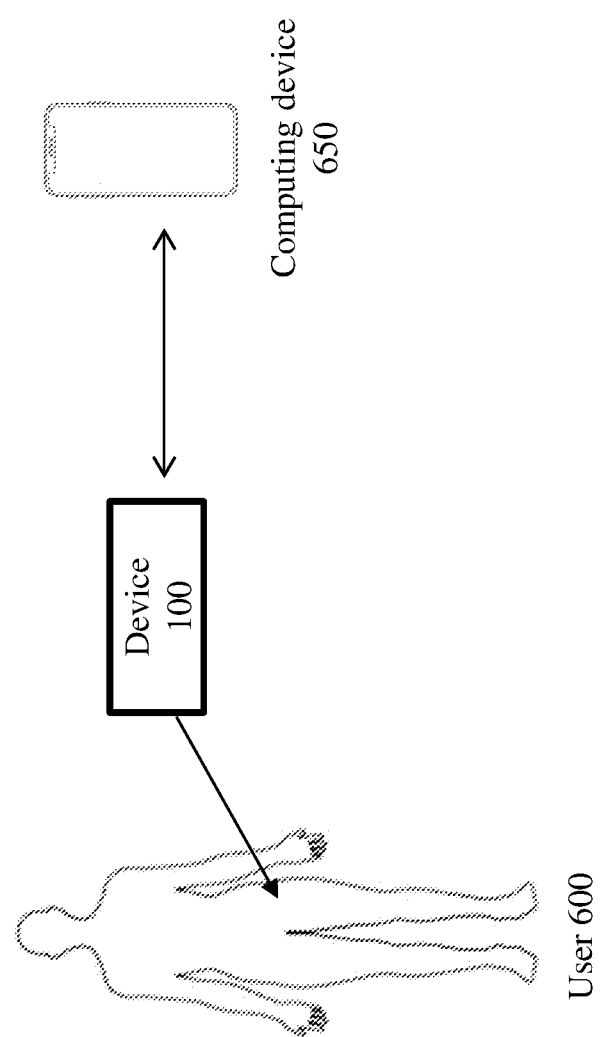
FIG. 6 is an illustration of a human implantable version of the exemplary sensor for measuring ambient levels of a substance or an environmental attribute, according to an example embodiment.

In another embodiment, the device 100 (or 200, 300, 400, 500) may be implantable in human patients for medical applications such as detection of hypoxia and infection in tissues and can be used for other applications such as monitoring environmental or food conditions. See FIG. 6. Infection markers can be more sensitive and specific in synovial fluid because they are localized to the site of infection. Also, changes in pH levels and temperature correlate to bacterial infection. However, to detect pH in synovial fluid there aren't currently available diagnostic tools that can do so easily and effectively for detection of infections. Hence, in one embodiment, the device 100 is implemented as an implantable wireless sensor to provide pH and/or temperature sensor data.

The claimed device 100 could be miniaturized using microelectronics and configured to be suitable for implantation in humans. The claimed device 100 can also provide wireless signal transmission and low power consumption for long term pH monitoring. Typical pH sensors are made of electrodes and are not implantable due to the size. Also, electrodes can degrade over time and most electrodes are not implantable. The claimed device 100 can be fabricated as a miniaturized silicon-based sensor that can be implanted in humans. Some materials which can be used for pH sensing are biocompatible and provide resistance to certain body enzymes and microbiological degradation, which allows for long term monitoring of pH in-vivo. A pH sensitive hydrogel is one example of said material. The claimed deice 100 may also use energy harvesting, inductive charging, etc.

After recording the pH and/or temperature measurements, the device 100 transmits the pH and/or temperature data, using the RF transmitter 104, to a computing device 650 for further analysis by user, such as a medical professional or an automated system, which may include algorithms to transmit certain data of interest, for example optimized data collection such as averages, once an hour, when above or below a certain limit. The computing device 650 may include, without limitation, a server, a database, a network, a call center, and a computer. A medical professional may have access to the computing device. The user 600 may have a communication device with software or an app that allows for communication and analysis about the sensor data with the computing device and/or the medical professional.

The claimed device 100 implemented as an implantable device is an advancement over the prior art because the current methods of diagnosing post-surgical infections include systemic markers of inflammation which have poor specificity and sensitivity for implant-associated infection and do not localize the source of inflammation. In detecting signs of infection, systemic inflammatory response syndrome (SIRS), or sepsis, clinicians also must use expensive medical equipment and expertise and lab tests. They are not scalable for use in the home of patients and also don't continuously take measurements. Clinicians must rely heavily on patients and caregivers while they are not in their healthcare facilities which aren't always reliable or objective. The claimed device 100 addresses these issues by providing a simple, cost-effective, and accurate way of detecting pH and temperature changes using a safe implantable device.

Over the years, implantable devices have become increasingly common as a treatment option for many patients to help manage diseases and disorders, save lives, and increase quality of life. Some examples of these devices are joint prosthetics such as artificial knee joints, heart valves, endovascular stents, deep brain stimulators, and many more. As with any procedure, there is some risk that comes with these implantable devices. One risk is infection which can cause SIRS, sepsis, and possibly death. In prosthetic joints in particular, life-threatening infections are less likely but may lead to significant morbidity and disability or additional costly surgeries. One of the leading causes of failure following joint replacement surgery is post-surgical infections. If detected early they can possibly be treated with antibiotics and surgical debridement, but if delayed, the bacteria can produce antibiotic resist biofilms which would require removal of the prosthetic implants. Therefore, time is critical in detecting infections to prevent further complications. The claimed device 100 addresses these issues by providing an efficient way of detecting infections using an implantable device.

SIRS has specific criteria of two or more of the following: a fever or hypothermia (body temperature >38° C. or <36° C.), tachycardia (heart rate >90), tachypnea (respiratory rate >20 or $PaCO^2$<32 mm Hg), leukocytosis or leukopenia (WBC >12,000/mm$^3$ or <4,000/mm$^3$, or >10% band forms). When there are two or more of the SIRS criteria and there is a suspected or confirmed source of infection, then it qualifies as sepsis. To avoid sepsis, monitoring for signs of infection and SIRS are critical to watch for post device implantation. Yet, the expertise and tools to do so are scarce. Patients are usually discharged with paper post-operative instructions and follow-up appointments, but clinicians are forced to rely on patients' non-clinical judgements and monitoring and reporting of their symptoms in everyday life to detect these signs. The claimed device 100 addresses these issues by providing an accurate way of measuring and monitoring said signs of infections.

Currently, post-surgery infections are diagnosed based on a combination of clinical findings based on nonspecific symptoms, laboratory results from peripheral blood, microbiological data, intraoperative inspection, imaging techniques, and histological evaluation of periprosthetic tissue. With joint replacements, there is concern for infected hardware or cellulitis. From an inpatient therapy perspective, therapists will frequently take a patient's vital signs pre and post treatment sessions. This objectively evaluates how a patient is tolerating and responding to treatment, as well as points to possible infection post operatively. From an inpatient nursing perspective, nurses are performing frequent skin checks and evaluating any noted redness, heat, swelling, malodor, or abnormal drainage. All inpatient practitioners will also assess for any fever or chills, additional signs of possible infection for patients post operatively. From an outpatient therapy perspective, skin checks and taking vital signs pretreatment is important to continue to assess for overall patient wellness in addition to any signs of possible infection. Patients also subjectively describe their progress post-operation, and this is noted in therapy documentation. Most take home methods require a patient to evaluate themselves, possibly take measurements, and then call their clinician if there are any abnormalities. There are currently no implantable pH sensors for clinical uses. The claimed device 100 addresses these issues by providing an efficient way of detecting infections at home and post-operatively.

Figure 7:
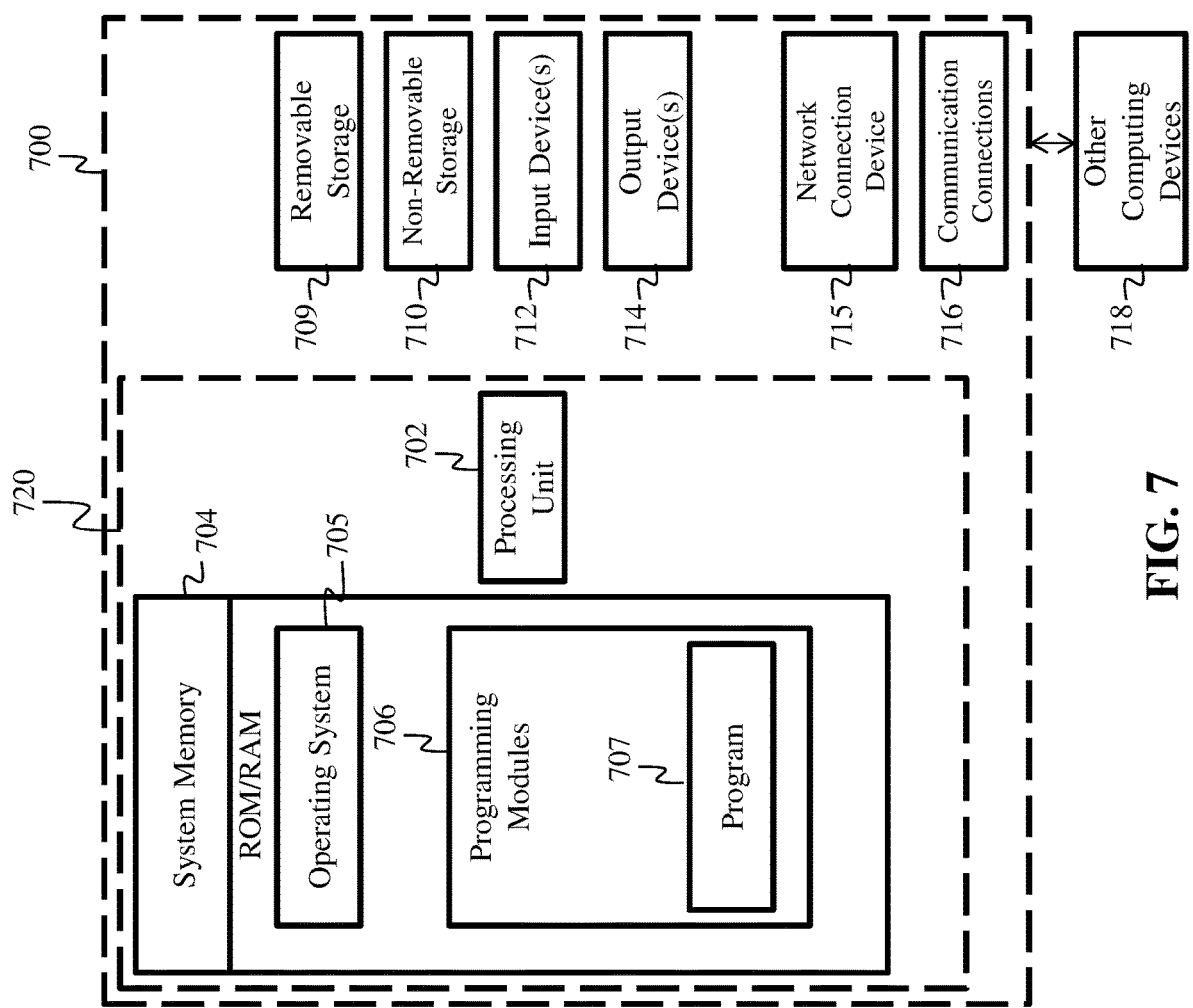
FIG. 7 is a block diagram of a system including an example computing device and other computing devices.

FIG. 7 is a block diagram of a system including an example computing device 700 and other computing devices. Consistent with the embodiments described herein, the aforementioned actions performed by processor 150 may be implemented in a computing device, such as the computing device 700 of FIG. 7. Any suitable combination of hardware, software, or firmware may be used to implement the computing device 700. The aforementioned system, device, and processors are examples and other systems, devices, and processors may comprise the aforementioned computing device. Furthermore, computing device 700 may comprise an operating environment for systems 100, 200, 300, 400, 500, as described above.

With reference to FIG. 7, a system consistent with an embodiment may include a plurality of computing devices, such as computing device 700. In a basic configuration, computing device 700 may include at least one processing unit 702 and a system memory 704. Depending on the configuration and type of computing device, system memory 704 may comprise, but is not limited to, volatile (e.g., random-access memory (RAM)), non-volatile (e.g., read-only memory (ROM)), flash memory, or any combination of memory. System memory 704 may include operating system 705, and one or more programming modules 706. Operating system 705, for example, may be suitable for controlling computing device 700's operation. In one embodiment, programming modules 706 may include, for example, a program module 707 for executing the actions of processor 150. Furthermore, embodiments may be practiced in conjunction with a graphics library, other operating systems, or any other application program and is not limited to any particular application or system. This basic configuration is illustrated in FIG. 7 by those components within a dashed line 720.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 700. Any such computer storage media may be part of device 700. Computing device 700 may also have input device(s) 712 such as a keyboard, a mouse, a pen, a sound input device, a camera, a touch input device, etc. Output device(s) 714 such as a display, speakers, a printer, etc. may also be included. Computing device 700 may also include a vibration device capable of initiating a vibration in the device on command, such as a mechanical vibrator or a vibrating alert motor. The aforementioned devices are only examples, and other devices may be added or substituted.

Computing device 700 may also contain a network connection device 715 that may allow device 700 to communicate with other computing devices 718, such as over a network in a distributed computing environment, for example, an intranet or the Internet. Network connection device 715 may be a wired or wireless network interface controller, a network interface card, a network interface device, a network adapter, or a LAN adapter. Network connection device 715 allows for a communication connection 716 for communicating with other computing devices 718. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 704, including operating system 705. While executing on processing unit 702, programming modules 706 (e.g., program module 707) may perform processes including, for example, one or more of the stages of the processes described above. The aforementioned processes are examples, and processing unit 702 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A pH sensor comprising:
 a) an enclosure comprising:
  i) a chamber having an interior volume;
  ii) a pH sensitive material located within the chamber, wherein said material changes volume according to an ambient pH level;
  iii) a marker located within the material; and
  iv) a sub-sensor configured to measure displacement of the marker within the chamber;
 b) a processor located within the enclosure, the processor communicably coupled with the sub-sensor, the processor configured for collecting pH data from the sub-sensor; and
 c) a power supply communicably coupled with the processor.

2. The sensor of claim 1, further comprising a radio frequency (RF) transmitter located within the enclosure, wherein the processor is communicably coupled with the RF transmitter and wherein the processor is configured for activating the RF transmitter to transmit the pH data.

3. The sensor of claim 2, wherein the chamber comprises rigid walls and one or more opening.

4. The sensor of claim 3, wherein the pH sensitive material comprises a pH-sensitive polymer.

5. The sensor of claim 4, wherein the marker comprises a metallic element.

6. The sensor of claim 5, wherein the sub-sensor comprises a capacitive displacement sensor.

7. The sensor of claim 6, wherein the power supply is a low voltage power supply.

8. The sensor of claim 6, wherein the power supply comprises an energy harvesting device.

9. The sensor of claim 6, wherein the power supply comprises an inductive charging device.

10. The sensor of claim 1, further comprising a radio frequency (RF) receiver located within the enclosure, wherein the processor is communicably coupled with the RF receiver.

11. A temperature sensor comprising:
a) an enclosure comprising:
   i) a chamber having an interior volume;
   ii) a temperature sensitive material located within the chamber, wherein said material changes volume according to an ambient temperature;
   iii) a marker located within the material; and
   iv) a sub-sensor configured to measure displacement of the marker within the chamber;
b) a processor located within the enclosure, the processor communicably coupled with the sub-sensor and configured for collecting temperature data from the sub-sensor; and
c) a power supply communicably coupled with the processor.

12. The sensor of claim 11, further comprising a radio frequency (RF) transmitter located within the enclosure, wherein the processor is communicably coupled with the RF transmitter and wherein the processor is configured for activating the RF transmitter to transmit the temperature data.

13. The sensor of claim 12, wherein the chamber comprises rigid walls and one or more opening.

14. The sensor of claim 13, wherein the temperature sensitive material comprises a temperature-sensitive polymer.

15. The sensor of claim 14, wherein the marker comprises a metallic element.

16. The sensor of claim 15, wherein the sub-sensor comprises a capacitive displacement sensor.

17. The sensor of claim 16, wherein the power supply is a low voltage power supply.

18. The sensor of claim 16, wherein the power supply comprises an energy harvesting device.

19. The sensor of claim 16, wherein the power supply comprises an inductive charging device.

20. The sensor of claim 11, further comprising a pH sensitive material located within the chamber, wherein said material changes volume according to an ambient pH level, wherein the processor is configured for collecting pH data from the sub-sensor.

21. The sensor of claim 11, further comprising a radio frequency (RF) receiver located within the enclosure, wherein the processor is communicably coupled with the RF receiver.

22. A sensor comprising:
a) an enclosure comprising:
   i) a chamber having an interior volume;
   ii) a material sensitive to a particular substance or environmental attribute located within the chamber, wherein said material changes volume according to an ambient level of said particular substance or environmental attribute;
   iii) a marker located within the material; and
   iv) a sub-sensor configured to measure displacement of the marker within the chamber;
b) a processor located within the enclosure, the processor communicably coupled with the sub-sensor, the processor configured for collecting data from the sub-sensor; and
c) a power supply communicably coupled with the processor.

* * * * *